(12) United States Patent
Khillar et al.

(10) Patent No.: US 11,347,802 B2
(45) Date of Patent: May 31, 2022

(54) QUERY GENERATION USING NATURAL LANGUAGE INPUT

(71) Applicant: Citrix Systems, Inc., Fort Lauderdale, FL (US)

(72) Inventors: Shiv Prasad Khillar, Karnataka (IN); Saifulla Shaik, Karnataka (IN); Nagendra Tank, Karnataka (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 273 days.

(21) Appl. No.: 16/520,512

(22) Filed: Jul. 24, 2019

(65) Prior Publication Data

US 2021/0026898 A1 Jan. 28, 2021

(51) Int. Cl.
*G06F 16/9032* (2019.01)
*G06F 40/211* (2020.01)

(52) U.S. Cl.
CPC ...... *G06F 16/90332* (2019.01); *G06F 40/211* (2020.01)

(58) Field of Classification Search
CPC .......................... G06F 16/90332; G06F 40/211
See application file for complete search history.

(56) References Cited

U.S. PATENT DOCUMENTS

| 10,706,045 | B1 * | 7/2020 | Hasija | G06F 16/243 |
| 2004/0111262 | A1 * | 6/2004 | Maison | G10L 15/18 |
| | | | | 704/251 |
| 2009/0037488 | A1 * | 2/2009 | Abrams | G06F 16/258 |
| 2011/0161077 | A1 * | 6/2011 | Bielby | G10L 15/32 |
| | | | | 704/231 |
| 2016/0140123 | A1 | 5/2016 | Chang et al. | |
| 2017/0116260 | A1 | 4/2017 | Chattopadhyay | |
| 2017/0185653 | A1 * | 6/2017 | Huang | G06F 16/2468 |
| 2018/0253432 | A1 * | 9/2018 | Abu-Saba | G06F 16/285 |
| 2020/0311085 | A1 * | 10/2020 | Lucas | G06F 16/24542 |
| 2020/0394190 | A1 * | 12/2020 | Chaudhuri | G06F 16/243 |

OTHER PUBLICATIONS

Oct. 9, 2020—WO International Search Report and Written Opinion—App PCT/US2020/042882.

\* cited by examiner

*Primary Examiner* — Sonia L Gay
(74) *Attorney, Agent, or Firm* — Baner & Witcoff, Ltd.

(57) ABSTRACT

Methods and systems for generation of a database schema compliant search query based on a natural language input are described herein. Natural language input may be received from a computing device. The natural language input may be associated with multiple search requests to a database. The natural language input may be parsed into a plurality of segments. The plurality of segments may be, for example, one or more words of a text string. At least one identifier for the plurality of segments may be associated with one or more confidence values. The natural language input may be converted into a single search query based on the confidence values and/or on a set of rules. The single search query may be initiated with respect to the database. The single search query may fetch content more efficiently than the multiple search requests.

21 Claims, 7 Drawing Sheets

|  | 502a | 502b | 502c | 502d |
|---|---|---|---|---|
|  | ID | FIRST NAME | LAST NAME | DEPARTMENT |
| 501a | 1 | John | Smith | Accounting |
| 501b | 2 | Bob | Allen | Engineering |
| 501c | 3 | Steve | Smith | Accounting |
| 501d | 4 | Allen | Johnson | Engineering |
| 501e |  |  |  |  |

|  | 502a | 502b | 502c | 502d |
|---|---|---|---|---|
|  | ID | FIRST NAME | LAST NAME | DEPARTMENT |
| 501a | 1 | John | Smith | Accounting |
| 501b | 4 | Allen | Johnson | Engineering |
| 501e |  |  |  |  |

QUERY GENERATION USING NATURAL LANGUAGE INPUT

FIELD

Aspects described herein generally relate to computer databases, search queries, language processing, and hardware and software related thereto. More specifically, one or more aspects describe herein provide improved processing of search queries for computer databases.

BACKGROUND

Databases are used for a variety of commercial and personal purposes. As storage becomes cheaper and more readily available, users are increasingly storing more data in more complex ways, which makes methods of storing and retrieving that data increasingly important. For example, many corporations now pay for the right to store content on a network of remote databases (commonly referred to as cloud storage) because such services are often significantly more affordable and scalable.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Aspects described herein are directed towards determining a query for a database based on a natural language input. A natural language input may be received from a first computing device. The natural language input may have been provided (e.g., entered) by a user and may be intended for execution with respect to a database. The natural language input may be divided into one or more segments, and the one or more segments may each correspond to one or more words in the natural language input. One or more segments may correspond to particular segments (e.g., columns, tables) of the database. One or more segments may correspond to predefined operations authorized to be performed with respect to the database. One or more segments may correspond to search clauses, such as "andwhere," "orwhere," "order by," or the like. One or more segments may have no meaning, and may be discarded. The segments may be evaluated by a statistical model, and confidence levels corresponding to the segments may be determined. For example, the statistical model may be trained based on a history of queries to the database (e.g., by a particular user account), such that the one or more segments may be modified based on a history of recent user queries to the same database. Based on determining that the confidence levels satisfy a threshold, a query (e.g., a GraphQL-compliant query) may be generated based on a database schema (e.g., a GraphQL database schema) associated with the database. The generated query may be validated based on the database schema and, if the validation is successful, the query may be executed with respect to the database. For example, the generated and validated query may be transmitted to the database for execution.

For example, a computing device may receive one or more words associated with a natural language input for a database associated with a second computing device. The computing device may determine a first word, of the one or more words, associated with a column in the database. The computing device may also determine a second word, of the one or more words, associated with a predefined search operation permitted by the database. The computing device may then generate, based on a history of queries to the database, a query that complies with one or more rules defined by a database schema associated with the database. That generated query may associate the first word with one or more attributes and may associate the second word with one or more symbols. The generated query may be executed with respect to the database.

As another example, a computing device may determine one or more first portions of the natural language input that correspond to a column in the database using a statistical model. The one or more first portions may be determined based on one or more words in a natural language input and based on a database schema associated with a database. The computing device may also determine one or more second portions of the natural language input that correspond to a predefined search operations permitted by the database. A first confidence level for the one or more portions and a second confidence level for the one or more second portions may be determined. Then, the computing device may generate, based on determining that the confidence levels satisfy a threshold, a query comprising the one or more first portions and the one or more second portions. That generated query may comply with one or more rules of the database schema. The generated query may then be executed with respect to the database.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Given the growth in the volume and complexity of databases, there is an ongoing need for improvements in the way in which databases are queried and in which results from those databases are delivered. For example, queries may be formatted to request only the information required from a database, such that those queries do not entail unnecessary processing or bandwidth costs. As another example, databases may be duplicated onto different servers worldwide in order to more quickly deliver database content to worldwide users, meaning that user queries should be delivered to not just to any database, but instead to a database closest to a user. Many existing database systems use multiple requests to a server to fetch desired data. For example, a single query with multiple wherein clauses may entail multiple requests to a server, each corresponding to one of the multiple wherein clauses. This can be inefficient and entail a significant amount of delay.

Various application programming interfaces (APIs) and tools have been developed to improve the manner in which databases are queried and the manner in which database query results are delivered. For example, the GraphQL data query and manipulation language developed by Facebook, Inc. of Menlo Park, Calif., provides a method for programmers to define, e.g., in a database schematic, the structure of a database and to allow queries to databases to be configured based on that structure. GraphQL thereby enables programs to intelligently query for data that is needed, which can be significantly more efficient, particularly where query results are delivered over a bandwidth-limited network.

While the GraphQL data query and manipulation language may advantageously avoid some of the multiple requests described above, GraphQL is a strongly typed language and is thus difficult for manual entry by users. In other words, GraphQL queries have particularized requirements (e.g., formatting requirements) which do not make them readily amenable to use by a user. Thus, GraphQL queries may be limited to circumstances where users can be carefully guided through a query input process, such as where query input comprises selecting from a limited set of options in a menu.

Aspects described herein present numerous advantages, including implementing the advantages of strongly-typed data query and manipulation languages such as GraphQL (including, for example, avoiding undesirable multiple requests to a database) while avoiding the disadvantages thereof (e.g., the difficulty with which users have in formatting compliant queries). As will be described in further detail below, by formatting natural language input into a format compliant with a strongly-typed format (e.g., GraphQL), a user may enjoy the benefits of the simplicity of natural language input while also enjoying the benefits of faster, better database queries provided by the strongly-typed format.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, computer databases may be configured to accept queries (e.g., search queries) and return results based on those queries. For example, a database may store information (e.g., a plurality of textual paragraphs, files, documents), and a query comprising a particular term may cause the database to return results comprising segments of the information containing the term. The manner in which the query is processed, as well as the manner in which results are provided, may be dependent on the structure of the database. For example, numerical queries (e.g., "all values greater than 5") may be performed with respect to columns in a table comprising numerical values. Such queries, however, may be difficult to perform on strings of text (e.g., arbitrary paragraphs). Databases may be structured to limit queries based on the structure of all or segments of the database such that, for example, particular queries may be associated with particular columns of a database, but not others. For example, a query comprising a text input may be limited to being executed to segments of a database storing text content, whereas a query comprising numerical information may be executed on segments of a database storing text content and/or numerical content. To preserve bandwidth, processing, and storage resources, databases may also be configured to limit the scope of results returned based on a particular query. For example, with respect to a database comprising personal information (e.g., first and last name, address, phone number), a query comprising a first and last name requesting a phone number need not also receive results comprising an address.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Figure 1:
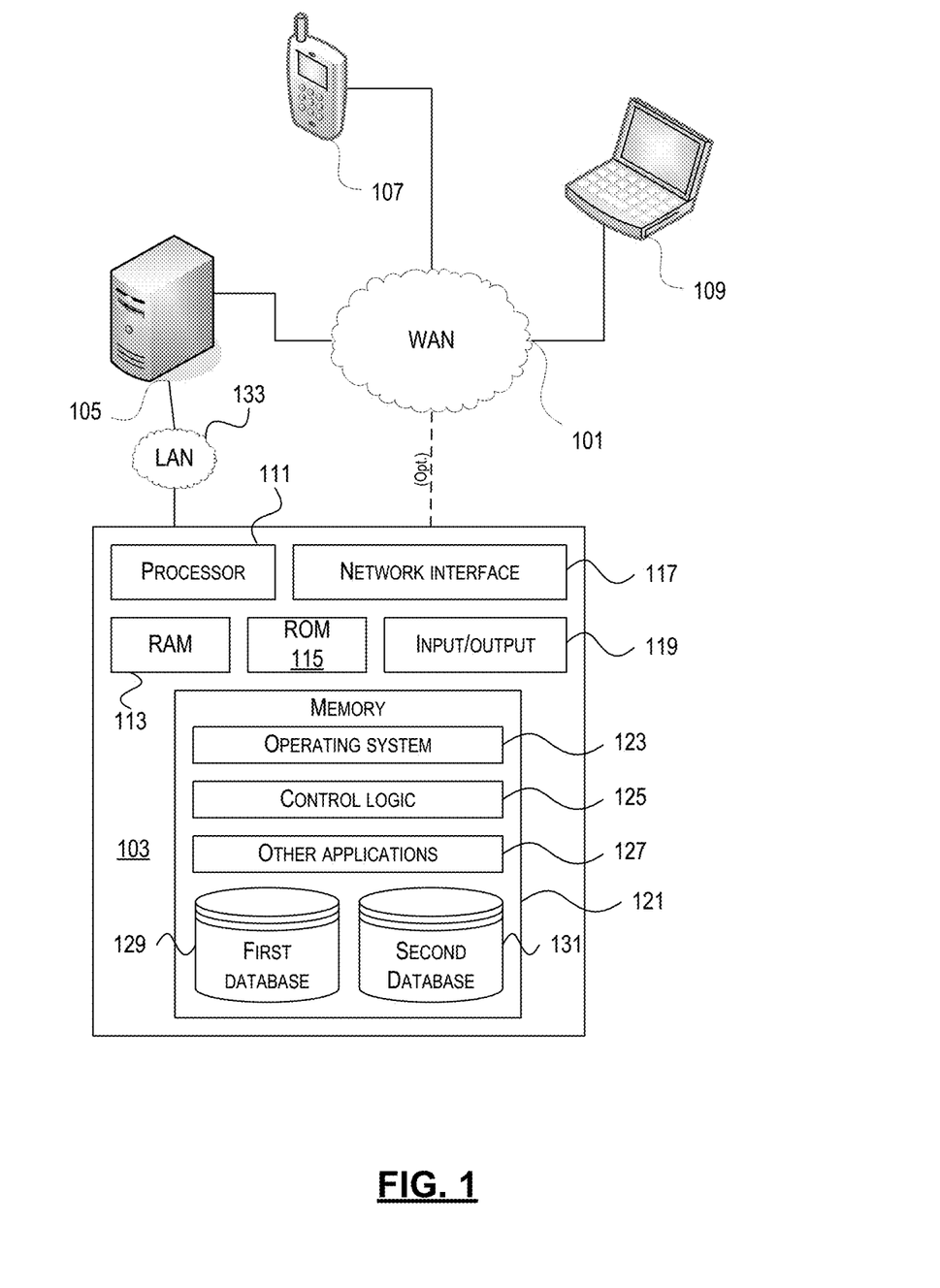
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
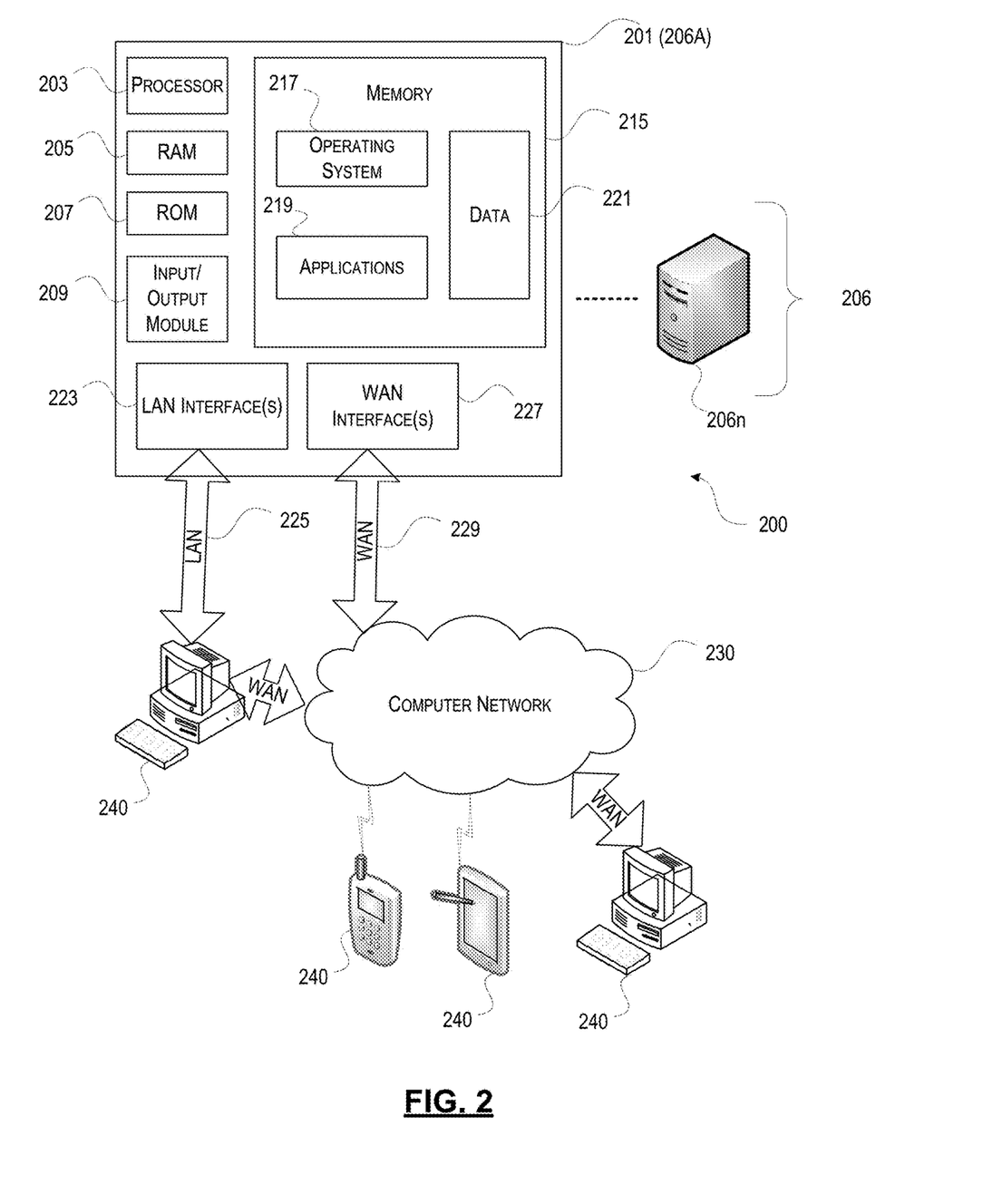
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Databases, Queries, Results, and GraphQL

Figure 3A:
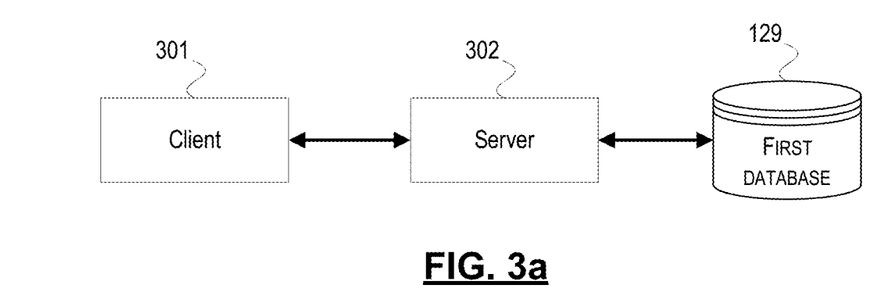
FIG. 3a shows a client which may transmit queries via a server to a database.

FIG. 3a illustrates how a client 301 may transmit queries and receive results from the first database 129 via a server 302. Though the first database 129, a single server (the server 302), and a single client (the client 301) are shown, one or more databases and/or one or more servers may be implemented. The client 301 may be the same or similar as the client computers 107, 109, and the server 302 may be the same or similar as one or more of the servers 206a-206n. Additionally and/or alternatively, the client 301, the server 302, and/or the first database 129 may be connected via a network, and/or may be all or segments of the same computing device (e.g., different logical segments of software executing on a single computing device). The client 301 may transmit, via the server 302, a query to the first database 129. The server 302 may execute the query with respect to the first database 129. In response, the server 302 may transmit, from the first database 129, one or more results (e.g., the results 600) to the client 301. Errors in query syntax may be detected by the server 302 and/or the first database 129. For example, an improperly-formatted query may be executed with respect to the first database 129, may cause generation of an error, and the error message may be returned to the client 301.

Figure 3B:
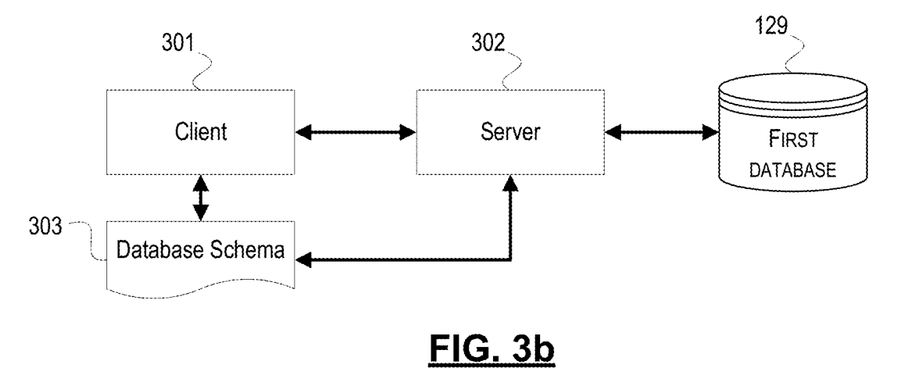
FIG. 3b shows a client which may transmit queries via a server to a database, where both the client and server refer to a database schema for validation.

FIG. 3b illustrates how the client 301 may transmit queries and receive results from the first database 129 via the server 302 and with respect to a database schema 303. The database schema 303 may be any data (e.g., a file) which provides information with respect to a database (e.g., the first database 129). That information may include one or more rules associated with a database which improve queries and/or results with respect to the database. The database schema 303 may additionally or alternatively be all or segments of a function, such that the function may be called to provide information about the database. The database schema 303 may be stored on and/or may otherwise be part of one or more computing devices, such as the client 301, the first database 129, the server 302, or another computing device. For example, the client 301 may store a copy of the database schema 303 in memory. The database schema 303 may comprise an indication of one or more segments of the first database 129, a structure of the first database 129, one or more operations which may be performed with respect to the first database 129, and/or the like. For example, the database schema 303 may provide one or more indications of a structure of the database (e.g., a listing of columns in the database), one or more indications of how the database (or segments thereof) is formatted (e.g., the formatting of content stored by the columns), one or more indications of functionality of the database (e.g., operations permitted with respect to the one or more columns or the one or more rows, such as an indication that a "greater than" operation will not work on a field comprising a paragraph of text content), and the like. The client 301 and/or the server 302 may have access to (e.g., store a copy of, routinely retrieve via the Internet a copy of) the database schema 303. In this manner, the client 301 and/or the server 302 may use the database schema 303 to format queries and/or results. For example, the client 301 may prevent a user from transmitting a query in violation of one or more rules for queries specified by the database schema 303. As another example, the server 302 may prevent execution of a query that violates one or more rules for queries specified by the database schema 303. As another example, the server 302 may format results from the first database 129 based on one or more formatting structures specified by the database schema 303. The database schema 303 may be, e.g., one or more files specifying GraphQL structure. For example, the database schema 303 may define one or more symbols (e.g., permitted operations) for a database. By providing such information about the database (e.g., the first database 129), the database schema 303 provides numerous technological improvements. For example, the client 301 may use the database schema 303 to determine if a particular query is supported by the database. As another example, and as detailed further below, the database schema 303 may be used by the client 301 to guide (and thereby improve) user query input, such that results from that user query input may be improved as well.

Computing devices, such as the client 301 and the server 302, may be configured to periodically query one or more computing devices and update the database schema 303. For example, based on determining that the database schema 303 should be updated, the client 301 may download a new version of the database schema 303. As a database may change over time (e.g., columns may be added or removed, tables may be added or removed, or the like), updating the database schema 303 in this manner may advantageously ensure that the database schema 303 accurately reflects the database. For example, the database schema 303 may comprise a list of tables of the first database 129, and the server 302 may update the database schema 303 responsive to a determination that a new table was added to the first database 129 such that the list of tables includes the new table.

Figure 4:
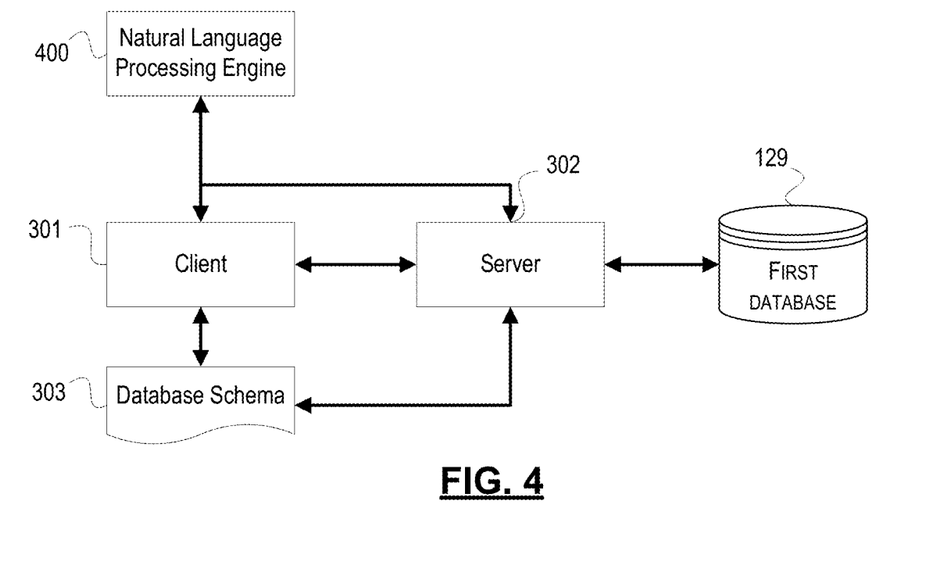
FIG. 4 shows a natural language processing engine which may be used by a client and a server to process queries in view of a database schema.

FIG. 4 illustrates how the client 301 may transmit queries and receive results from the first database 129 via the server 302 and in view of the database schema 303 and a natural language processing engine 400. Though the natural language processing engine 400 is depicted as separate from the client 301 and the server 302 in FIG. 4, the natural language processing engine 400 may execute on the client 301 and/or the server 302, and/or may execute on a different computing device. The client 301, the natural language processing engine 400, the server 302, the database schema 303, and the first database 129 may all execute on the same or a similar computing device.

The natural language processing engine 400 may be configured to translate natural language input (e.g., input in English by a human) into a query which, e.g., comports with the database schema 303. As will be described in more detail in, e.g., FIG. 7, the natural language processing engine 400 may receive, from a user, a natural language input (e.g., "How many employees work in the Engineering department?") and convert the natural language input into a format acceptable based on the database schema 303 (e.g., a query for all rows in the database table 500 where the fourth column 502d has a value of "Engineering"). Additionally and/or alternatively, the natural language processing engine 400 may be configured to, based on the natural language input, transmit instructions to the client 301 which cause the client 301 to generate a query. That query may be executed with respect to the first database 129.

Figure 5:
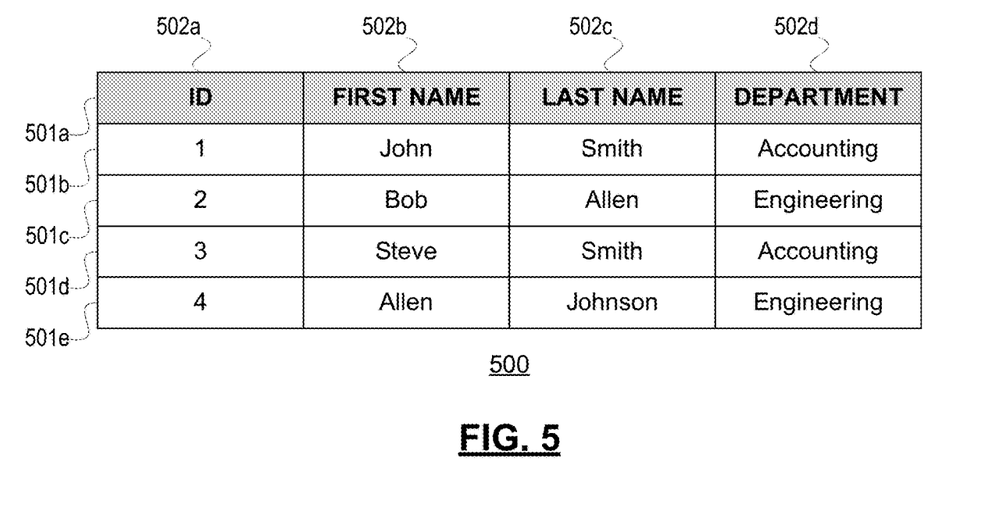
FIG. 5 shows an illustrative database table stored by a database.

FIG. 5 depicts an example of a database table 500. The database table 500 may be stored on a computing device, such as the first database 129, the one or more of the servers 206a-206n, and/or via the memory 121. For example, the database table 500 may be all or segments of the first database 129 and/or the second database 131. While databases may store data in a variety of formats (e.g., relational databases, flat files, or the like), FIG. 5 depicts the database table 500 as a table for simplicity. The database table 500 comprises a header row 501a, a first row 501b, a second row 501c, a third row 501d, and a fourth row 501e. The database table 500 further comprises a first column 502a, a second column 502b, a third column 502c, and a fourth column 502d. For example, the data entry at the first row 501b and the second column 502b corresponds to the value "John." As indicated by the header row 501a, the first column 502a corresponds to an identifier, the second column 502b corresponds to a first name, the third column 502c corresponds to a last name, and the fourth column 502d corresponds to a department. For example, the second row 501c indicates that ID 2 corresponds to Bob Allen in the Engineering department.

Databases, such as the database table 500, may be queried. A query may comprise data, such as a word, which may be searched in a database. A query may comprise one or more wildcards, such as an asterisk, which indicate unknown data, such as unknown characters. For example, a query comprising the word "John*" (including the wildcard) executed with respect to the database table 500 may cause a result comprising two rows: the second row 501c (because of the second column 502b contains the value "John") and the fourth row 501e (because of the third column 502c contains the value "Johnson"). A query may comprise one or more numbers, arithmetic, or the like. For example, a query may request all values of the first column 502a greater than two, causing a result comprising the third row 501d (which has an ID of three, as indicated by the first column 502a) and the fourth row 501e (which has an ID of four, as indicated by the first column 502a). Queries may comprise a plurality of data elements associated with different segments of a database. For example, a query specifying a first name of "Steve" and a last name of "Smith" may be executed with respect to the database table 500, causing a result comprising the third column 501d.

Figure 6:
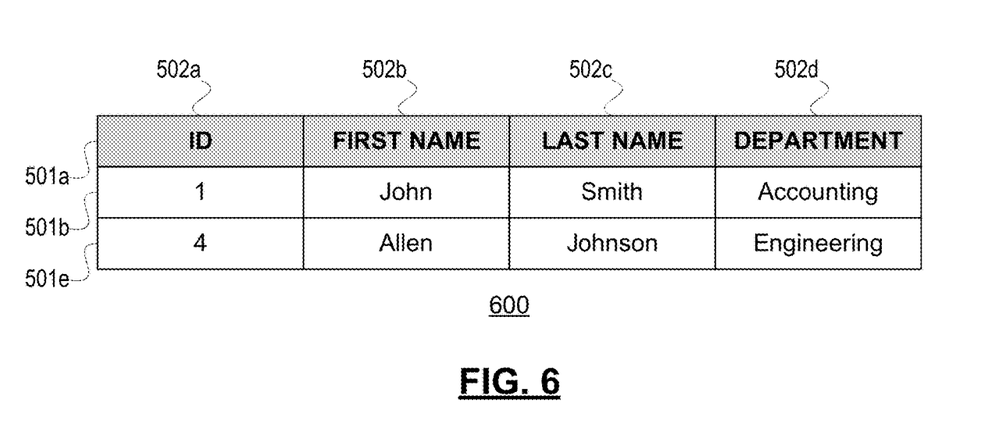
FIG. 6 shows illustrative results from a database in response to a query.

FIG. 6 show an example of results 600. The header row 501a, the first column 502a, the second column 502b, the third column 502c, and the fourth column 502d are the same as in FIG. 5. In response to a query, the results 600 comprise the first row 501b and the fourth row 501e of FIG. 3. Particularly, the results 600 shown in FIG. 4 may be the result of, for example, a query comprising "John*" such that the first row 501b is included because the second column 502b of the first row 501b comprises "John" and the fourth row 501e is included because the third column 502c of the fourth row 501e comprises "Johnson." As may be seen by comparing the results 600 with the database table 500, results from a query to a database may be formatted the same or similarly as the database. Additionally and/or alternatively, the results may be differently formatted. For example, the results 600 may be in a textual format, such as the Extensible Markup Language (XML) or as comma-separated values. As another example, the results 600 may be in a table form, but may omit one or more columns from the database table 500 (e.g., because the first column 502a, which corresponds to IDs, may be kept secret by an administrator of the database).

Databases, such as the first database 129 and/or the second database 131, may be formatted such that results to queries executed with respect to the database, such as the results 600, are in a particular structure. Additionally and/or alternatively, queries may be formatted to request results (e.g., the results 600) in a particular format. This may be advantageous where, for example, the database normally returns a large quantity of data and/or where data in a particular format is necessary for use with particular programs. For example, a query to the database table 500 may request a list of all first names (e.g., values stored in the second column 502b) in a comma-separated format, such that the results may comprise "John, Bob, Steve, Allen." As another example, where a database stores time and/or date values, the query may request the values in a Coordinated Universal Time format.

One example of a database format that permits queries specifying a result structure is the GraphQL data query and manipulation language developed by Facebook, Inc. of Menlo Park, Calif. As implemented, GraphQL database schema define a structure (types and fields) corresponding to a database and further define functions (e.g., particular queries) which may be executed with respect to that structure. GraphQL-formatted queries may be transmitted to a database, which may parse these queries based on the structure and functions defined by the GraphQL database schema. GraphQL thereby provides administrators (e.g., database administrators, programmers of APIs associated with a database, etc.) control over how queries to data may be performed. GraphQL also allows queries to data which is needed, rather receiving unnecessary quantities of data.

Query Generation

Figure 7:
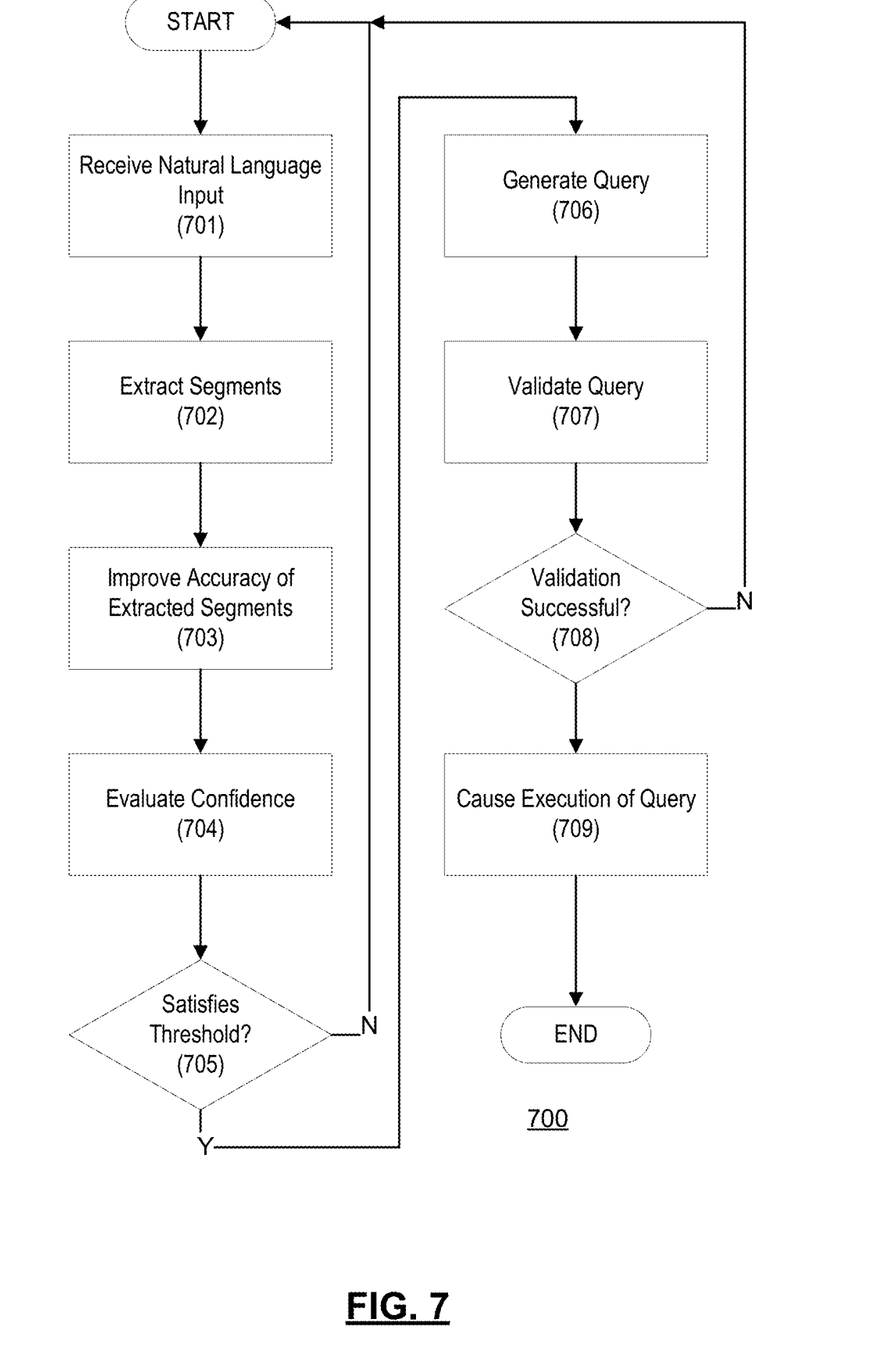
FIG. 7 is a flow chart with steps which may be performed to generate a query based on a natural language input.

FIG. 7 illustrates a method 700 which may be performed by the natural language processing engine 400, the client 301, and/or the server 302. The method 700 may be a set of instructions or steps of a process, such as may be stored in memory and executable by one or more processors (e.g., of a computing device). One or more of the steps of the process may be performed by one or more of the natural language processing engine 400, the client 301, and/or the server 302. For example, some steps in FIG. 7 may comprise multiple rounds of communication between the natural language processing engine 400 and the client 301.

In step 701, a natural language input may be received. The natural language input may be received by the natural language processing engine 400 from the client 301. For example, a user of the client 301 may enter a natural language input (e.g., "Who in the company is older than thirty?") into a website displayed by the client 301, and the natural language input may be transmitted from the client 301 to the natural language processing engine 400. During receipt of the natural language input, the client 301 may execute a search query recommendation algorithm, which may provide recommendations on the query. For example, the search query recommendation algorithm executing on the client 301 may, using the database schema 303, recommend certain terms (e.g., terms associated with particular columns or rows of the database table 500). As another example, the search query recommendation algorithm executing on the client 301 may provide auto-complete functionality based on segments of the database schema 303 (e.g., the names of columns in a database). Such a recommendation algorithm may advantageously enhance the accuracy of the natural language input by, e.g., avoiding misspellings of column titles of a database table. The search query recommendation algorithm may additionally and/or alternatively execute on the server 302, the natural language processing engine 400, and/or one or more other computing devices. For example, the search query recommendation algorithm may execute on a second server (e.g., a web server) hosting a web page comprising a search input box.

In step 702, one or more segments (e.g., tags) may be extracted from the natural language input. This step may be referred to as a segment extraction step and/or a feature extraction step. A natural language input may comprise a plurality of words, and extracting the segments may comprise determining one or more segments which may be respectively associated with different words of the plurality of words. For example, the natural language input "How many employees does Company A have?" may be broken into five segments: "How many," "Employees" "does," "Company A" and "have," with each different word having different meaning with respect to the query. For example, with respect to FIG. 5, "First" and/or "First Name" may correspond to the second column 502b, whereas "Department" may correspond to the fourth column 502d. The segments may be categorized and/or analyzed, e.g., using the database schema 303, to determine their meaning with request to a query.

Extracting the one or more segments may comprise tokenization of the natural language input. Such tokenization may comprise defining and/or classifying one or more segments of a string of characters, such as the natural language input. Tokenization may be performed by breaking one or more strings of characters into one or more segments based on use of whitespace or similar space delimiters.

One or more segments (e.g., tags) may be associated with attributes. Attributes may describe the data (e.g., arrangements of the data, properties of the data, locations of the data, columns in a table of the data, etc.) in a database. For example, one of more segments of a natural language input may be associated with an attribute because the one or more segments may correspond to a particular segment (e.g., a column) of a database. As a particular example, the word "Department" may be associated with the fourth column 502d of the database table 500. As another example, a collection of data (e.g., the second column 502b and the third column 502c) may together be associated with a single attribute (e.g., "Full Name"). In turn, different attributes (e.g., "Family Name," "Last Name") may refer to the same type of data. Attributes need not correspond to columns, but may instead describe data in a database in other ways. For example, attributes may correspond to the formatting of data (e.g., whether the content is formatted in compliance with the UTF-8 encoding standard), the length of data (e.g., a number of characters of a string), or the like. Attributes may be defined by the database schema 303.

One or more segments (e.g., tags) may be associated with symbols. Symbols may correspond to search operations, e.g., as defined by the database schema 303. For example, one or more segments of a natural language input may be associated with symbols because they indicate a relationship between an attribute and data. For example, the equals sign may be associated with an operation searching for a row with a particular column. As another example, the phrase "greater than" may associate a type of data (e.g., "number of employees") with a particular value (e.g., fifty), such that the combined clause searches for results where the type of data is greater than the particular value (e.g., rows where the number of employees is greater than fifty).

One or more segments (e.g., tags) may be associated with a clause. Clauses may correspond to, for example, conjunctive and disjunctive operators (e.g., "andwhere," "orwhere"), indications of which segment(s) of a database should be queried (e.g., "select"), and/or requests regarding the results provided (e.g., "groupby," "orderby"). For example, certain terms (e.g., "and," "moreover," "and wherein," and the like) may be associated with a conjunctive search. As another example, certain terms (e.g., "or," "but not") may be associated with a disjunctive search.

One or more segments (e.g., tags) may correspond to data which may be searched for in the database. For example, one or more words of phrases in a natural language input may be data (e.g., the word "John" in the natural language input "All employees with the first name John") which may be searched in a database (e.g., the database table 500) to return rows comprising that data (e.g., the first row 501b).

One or more segments (e.g., tags), such as stop words, may be unhelpful and/or irrelevant for the purposes of a search query. Segments corresponding to stop words (e.g., "the," "a," "an," "in") may be unhelpful and/or irrelevant for the purposes of executing a query with respect to a database. Such stop words may be unhelpful and/or irrelevant because, e.g., they may be grammatically correct (e.g., using the term "The Hague" as opposed to "Hague") but may have limited to no impact on the accuracy of a search query (e.g., searching "Hague" may be sufficient). Such stop words may be defined by a stop word list maintained by, e.g., the database schema 303. In some instances, the segments may refer to words that are not useful in creation or execution of a search query. For example, while the terms "and" and/or "or" may be important in a natural language input (e.g., in a natural language input such as "All employees in the Engineering or Accounting departments,"), the term "the" may not be useful in formatting a query because it may not be configured for execution with a database. In other instances, the segments may refer to information not present within the database, and thus not useful in execution of the search query. For example, the natural language input "All birthdays before March" may not be compatible with a database that does not store information about birthdays. In such instances, the one or more segments associated with the input may be discarded and/or ignored.

An example of how segments from an example natural language input may be categorized based on a database schema is shown below in Table 1. Table 1 represents how one or more segments of a natural language input may be categorized and may, for example, be stored in a memory of the client 301 the server 302, and/or the natural language processing engine 400. Table 1 is based on the natural language input "List of all documents shared with a size is greater than 100 MB" as executed with respect to a database comprising a list of documents.

TABLE 1

| Segment | Attribute | Clause | Symbol | Significance |
|---|---|---|---|---|
| List | 0 | 0 | 0 | None |
| of | 0 | 0 | 0 | None |
| all | 0 | 0 | 0 | None |
| documents | 1 | 0 | 0 | Select Clause |
| with | 0 | 0 | 0 | None |
| a | 0 | 0 | 0 | None |
| size | 1 | andwhere | 0 | Identifier of Column |

TABLE 1-continued

| Segment | Attribute | Clause | Symbol | Significance |
|---|---|---|---|---|
| is | 0 | 0 | 0 | None |
| greater than | 0 | 0 | 1 | > |
| 100 MB | 0 | andwhere | 0 | Value |

Table 1 comprises five columns: a column corresponding to segments of a natural language input, a binary indication of whether a segment is an attribute, an indication of whether the clause is conjunctive or disjunctive, an indication of whether the segment is a symbol, and an indication of the significance and/or meaning of the segment (as specified by, e.g., the database schema 303). As may be seen in Table 1, many words—"list," "of," "all," "with," "a," and "is"—are categorized as having no significance. Though "all" is ignored in this instance, "all" may not be ignored where, for example, results would be customarily limited to a predetermined number of results (e.g., such that searching for "all documents" would be associated with a request for all results, not just a predetermined number of results). The word "documents" operates as a select clause, which may indicate, for example, a segment (e.g., a table) of the database to focus on (e.g., a database table listing documents, instead of a database table listing users). The word "size" corresponds to a column (e.g., a size column of a documents database table). The phrase "greater than," in conjunction with the phrase "100 MB" provides parameters for the column (that is, the "size" column of the documents database table) and may be thereby considered a symbol. The clause "andwhere" used with respect to "size" indicates that the size query would be conjunctive with, e.g., other segments of the query. Thus, Table 1 simplifies the natural language input "List of all documents shared with a size is greater than 100 MB" to a query of a size column of a database table where the size column has a value greater than 100 MB.

In step 703, an accuracy of the one or more segments may be improved using, e.g., one or more statistical models. Due, in part, to the unpredictability and variety of natural language inputs, the one or more segments extracted in step 702 may imperfectly reflect the query intended by a user. For example, a user may mistype an input, misspell words, and/or otherwise provide a natural language input that is not easily translated into one or more segments. For example, "a" (as in, "a house") may normally be determined to have no meaning as part of step 702, but in context (e.g., as part of the natural language input "All first names starting with the letter A") may have meaning. To improve the accuracy of such segments, analysis may be performed (e.g., using a statistical model) may be executed with respect to the one or more segments. Such statistical models may include, for example, the conditional random field (CRF) statistical modeling method.

Accuracy of these segments may be improved by modifying the segments based on an analysis of the natural language input received in step 701, the segments extracted in step 702, a history of search queries (e.g., for a particular user account), a history of segments extracted, and/or a history of search results. When a user submits a sequence of natural language inputs (e.g., multiple inputs over a period of time), the inputs may be related such that the accuracy of segments determined from a current natural language input may be improved by analyzing previous natural language inputs. For example, the natural language processing engine 400 may use one or more statistical models to analyze previous inputs (e.g., previous inputs with particular order numbers) to determine that the segment "order" in a current input is more likely to refer to a column (e.g., an order number column), rather than a request that results from the query be ordered in a particular manner. As another example, two natural language queries in quick succession may suggest that the previous natural language input provided unsatisfactory results, such that assumptions made with respect to segments for the previous natural language input should not be made with respect to segments for the subsequent natural language input. As yet another example, the natural language processing engine 400 may store a history of inputs for each user account of a plurality of user accounts, such that the statistical models may, over time, learn the input tendencies of a particular user and use the user-specific search histories to better improve the accuracy of segments extracted in step 702.

The statistical models may determine one or more predicted segments based on the one or more segments extracted in step 702. For example, the statistical models may determine one or more predicted attributes and/or one or more predicted symbols. The natural language input in step 701 may lack one or more words which may be necessary for a complete query. For example, the natural language input "all old documents" may not be easily parsed into a query without foreknowledge of, e.g., what "old" is defined as, and which segment(s) of a database should be queried to determine the age of documents. Thus, the statistical models may be configured (e.g., trained using training data) to identify one or more related segments associated with the one or more segments extracted in step 702.

In step 704, one or more confidence levels (e.g., confidence values) may be determined for the segments. Confidence levels may be any indication (e.g., a Boolean value, a percentage) of a confidence of the accuracy of segments. For example, the statistical models in step 703 may determine that a segment is an attribute, but the accuracy of that determination may be unreliable, such that the segment may be associated with a 50% confidence level. As another example, the statistical models in step 703 may determine that a segment should be ignored, but indicate (e.g., using a Boolean value) that this determination is unreliable. The confidence level of a given segment may depend on the manner in which the segment was determined. For example, the one or more predicted segments may have a lower confidence value than the one or more segments extracted in step 702. As another example, a segment corresponding to a word that was manually typed by a user may be given a higher priority than a segment that was entered by the user using a menu (e.g., a drop-down menu).

In step 705, the confidence levels may be compared to a threshold. The threshold may be for all or some of the segments. For example, if an average confidence level of all segments determined in step 703 and analyzed by statistical models in step 704 is less than 50%, then the confidence levels might not satisfy the threshold. As another example, if more than five segments from the natural language input are indicated to be reliable, the confidence levels may satisfy the threshold. As yet another example, there may be a first threshold for segments corresponding to attributes and a different threshold for segments corresponding to symbols. Such thresholds may be configured to avoid bombarding a database with low-confidence queries (e.g., queries which are likely to contain errors and/or not produce desired results from the database). If the confidence levels do not satisfy the threshold, the method 700 may return to the beginning.

Additionally and/or alternatively, if the confidence levels do not satisfy the threshold, one or more of the segments may be discarded (e.g., ignored) so that the confidence levels satisfy the threshold. For example, one or more segments associated with an attribute and/or one or more segments associated with a symbol may be discarded such that the average confidence level rises to satisfies the threshold. If the confidence levels satisfy the threshold, the method 700 proceeds to step 706.

In step 706, a query may be generated using the segments. The query may be in a format which, e.g., complies with the database schema 303. For example, if the database schema 303 is a GraphQL schema, then the generated query may be a GraphQL query. The query generated in step 706 may be significantly different than the natural language input received in step 701. For example, the generated query may be structured in a manner (e.g., using XML syntax) that would be difficult for a user to manually type into a search box.

In step 707, the generated query may be validated, e.g., using the database schema 303. Though the generated query may be generated based on the database schema 303, the generated query may not comply with the database schema 303. For example, the query may be generated using the database schema 303, but subsequent validation using the database schema 303 may indicate that the generated query may be inconsistent or otherwise may result in an error. This may particularly the case where the query is generated using one version of the database schema 303, but may be validated using a different (e.g., more comprehensive) version of the database schema 303.

In step 708, it is determined whether the validation is successful. The validation may be successful if one or more rules defined by the database schema 303 are applied to the generated query and no errors are generated. The database schema 303 may comprise a function which, when executed with respect to the generated query, may indicate whether the validation is successful or not (e.g., by returning a binary value). If not, the method 700 may return to the beginning. Additionally and/or alternatively, the method 700 may return to step 702, such that the segments may be extracted anew from the natural language input. If the validation is successful, the method 700 proceeds to step 709.

In step 709, execution of the generated query may be performed. Initiation of the generated query may comprise causing a server (e.g., the server 302) to perform one or more steps in furtherance of the query with respect to a database (e.g., the first database 129). The initiation of the generated query may depend on, e.g., the structure of the database, the formatting of the query, and the like. For example, the first database 129 may be a Structured Query Language (SQL)-compliant server executing on a separate computing device and the generated query may be an SQL-compliant query, such that causing execution of the generated query may comprise transmitting the query to the SQL server for execution.

Figure 8:
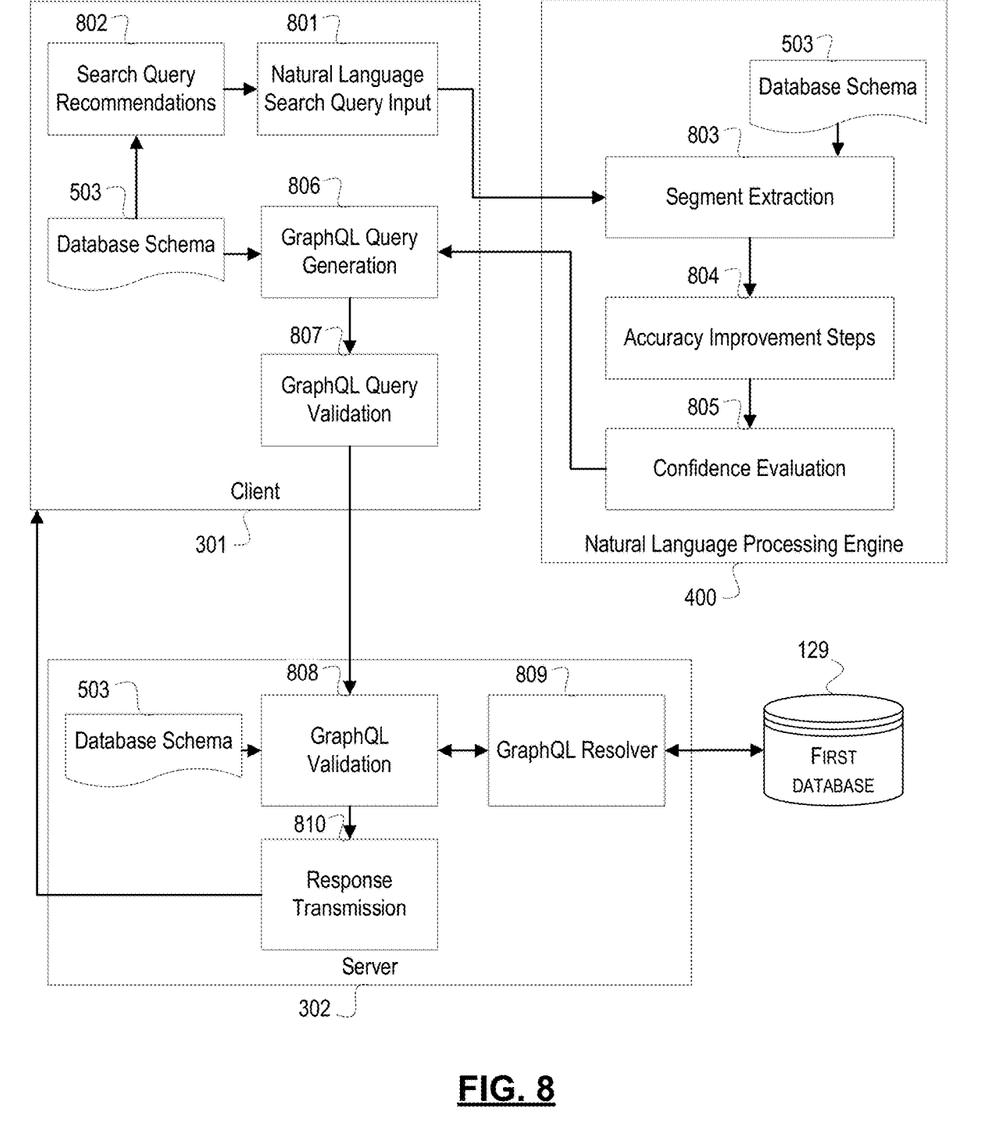
FIG. 8 is a diagram depicting how a client, a server, and a natural language processing engine may collectively generate a query based on a natural language input.

FIG. 8 is a diagram illustrating one example of how the client 301, the server 302, and the natural language processing engine 400 may receive a natural language input and generate a GraphQL query. Though various steps are depicted as elements as part of the client 301, the server 302, and/or the natural language processing engine 400, such steps may be performed by a single or multiple computing devices, and need not be performed exactly in the manner shown in FIG. 8. Such steps may generally correspond to the steps shown in FIG. 7. As shown in FIG. 8, the client 301, the natural language processing engine 400, and the server 302 may all have a version of the database schema 303. While the same database schema 303 is shown for all three devices, devices may have different versions of the database schema 303. For example, the client 301 may have a copy of the database schema 303 comprising rules for queries, whereas the server 302 may have a copy of the database schema 303 comprising rules for results.

In a process generally corresponding to step 701, the client 301 may receive natural language input 801 from a user. During input, search query recommendations 802 may be provided to the user based on the database schema 303. For example, the search query recommendations 802 may aid the user in typing the name of columns/fields of the database (e.g., using autocomplete) and/or may detail operations permitted by the database schema 303. The natural language input 801 may be, for example, a search box such as may be found on a website. The natural language input 801 may contain one or more menus which correspond to segments of the database. For example, the natural language input 801 may comprise a website with a text box for natural language input. The natural language input 801 may be sent to the natural language processing engine 400. Though various steps (e.g., the natural language input 801 and the search query recommendations 802) are shown in FIG. 8 as being performed by the client 501, these and other steps may be performed by the natural language processing engine 400 and/or the server 502. For example, the client 501 may be a thin client, such that all or most steps may be performed by remote computing devices such as the server 502.

In a process generally corresponding to step 702, the natural language processing engine 400 may perform segment extraction 803 on the received natural language input 801. In a process generally corresponding to step 703, the natural language processing engine 400 may then apply accuracy improvement steps 804 to the extracted segments. In a process generally corresponding to step 704, the natural language processing engine 400 may then perform a confidence evaluation 805 of the extracted segments. In a process generally corresponding to step 705, if the confidence levels determined during the confidence evaluation 805 satisfy a threshold, the segments (as improved using the statistical models and as associated with one or more confidence levels) may be sent to the client 301. Though the segment extraction 803, the accuracy improvement steps 804, and the confidence evaluation 805 are shown in FIG. 8 as performed by the natural language processing engine 400, these steps may additionally and/or alternatively be performed by the client 501 and/or the server 502.

In a process generally corresponding to step 706, the client 301 may perform GraphQL query generation 806. The GraphQL query generation may be based on the database schema 303. In a process generally corresponding to step 707, the client 301 may then perform GraphQL query validation 807. In a process generally corresponding to step 708, if the GraphQL query validation 807 is successful, the client 301 may transmit the GraphQL query to the server 302.

In a process generally corresponding to step 709, the server 302 may receive the validated GraphQL and may perform GraphQL validation 808 on the received query. The GraphQL validation 808 may be performed because, e.g., the client 301 may be untrusted and thus may provide a non-compliant query, because the copy of the database schema 303 maintained by the server 302 may be more comprehensive than the copy of the database schema 303 maintained by the client 301 (e.g., the server 302 performs more stringent validation than the client 301), or the like.

The query may then be transmitted via a GraphQL resolver 809 to be executed with respect to the first database 129. For example, the GraphQL Resolver 809 may, based on the query, execute one or more programs which cause the query to execute with respect to the first database 129. Results may be received by the server 302 and from the first database 129, which may be returned via the GraphQL resolver 809. The results may be subject to the GraphQL Validation 808. For example, the results may be validated based on the database schema 303. Response transmission 810 may be performed, such that the results received from the first database 129 may be, after the GraphQL Validation 808, transmitted to the client 301.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a computing device, natural language input from a client device, wherein the natural language input comprises a text string;
   parsing, by the computing device, the text string into a plurality of segments;
   determining, by the computing device, at least one identifier for the plurality of segments, wherein the at least one identifier is associated with one or more confidence values;
   converting, by the computing device, in response to determining at least a subset of the one or more confidence values is equal to or greater than a threshold, and based on a set of rules defined by a first GraphQL database schema, the natural language input into a single search query executable by Application Programming Interface (API) in a query language of GraphQL; and
   initiating, by the computing device and based on a second GraphQL database schema different from the first GraphQL database schema, the single search query to fetch content from a database so as to prevent transmission of multiple search requests by the client device responsive to the natural language input.

2. The method of claim 1, further comprising:
   discarding one or more of the plurality of segments based on determining that a first confidence value of the one or more confidence values satisfies a second threshold.

3. The method of claim 1, further comprising:
   determining, by the computing device, the one or more confidence values.

4. The method of claim 1, wherein converting the natural language input into the single search query is further based on determining, based on the set of rules, that one or more of the plurality of segments corresponds to a search operation.

5. The method of claim 1, further comprising:
   removing, from the text string and based on a stop word list, one or more words.

6. The method of claim 1, further comprising:
   updating, based on detecting a change to the database, the set of rules.

7. The method of claim 1, wherein a first segment of the plurality of segments is associated with one or more attributes.

8. The method of claim 1, wherein the one or more confidence values correspond to two or more of the plurality of segments, and wherein determining at least the subset of the one or more confidence values is equal to or greater than the threshold is based on comparing a combined value of the one or more confidence values to the threshold.

9. An apparatus comprising:
   one or more processors; and
   memory storing instructions that, when executed by the one or more processors, cause the apparatus to:
   receive natural language input from a client device, wherein the natural language input comprises a text string;
   parse the text string into a plurality of segments;
   determine at least one identifier for the plurality of segments, wherein the at least one identifier is associated with one or more confidence values;
   convert, in response to determining at least a subset of the one or more confidence values is equal to or greater than a threshold, and based on a set of rules defined by a first GraphQL database schema, the natural language input into a single search query executable by Application Programming Interface (API) in a query language of GraphQL; and
   initiate, based on a second GraphQL database schema different from the first GraphQL database schema, the single search query to fetch content from a database so as to prevent transmission of multiple search requests by the client device responsive to the natural language input.

10. The apparatus of claim 9, wherein the instructions, when executed by the one or more processors, further cause the apparatus to:
    discard one or more of the plurality of segments based on determining that a first confidence value of the one or more confidence values satisfies a second threshold.

11. The apparatus of claim 9, wherein the instructions, when executed by the one or more processors, further cause the apparatus to:
    determine the one or more confidence values.

12. The apparatus of claim 9, wherein the instructions, when executed by the one or more processors, further cause the apparatus to convert the natural language input further based on determining, based on the set of rules, that one or more of the plurality of segments corresponds to a search operation.

13. The apparatus of claim 9, wherein the instructions, when executed by the one or more processors, further cause the apparatus to:
    remove, from the text string and based on a stop word list, one or more words.

14. The apparatus of claim 9, wherein the instructions, when executed by the one or more processors, further cause the apparatus to:
    update, based on detecting a change to the database, the set of rules.

15. The apparatus of claim 9, wherein a first segment of the plurality of segments is associated with one or more attributes.

16. One or more non-transitory computer-readable media storing instructions that, when executed, cause a computing device to:
    receive natural language input from a client device, wherein the natural language input comprises a text string;
    parse the text string into a plurality of segments;

determine at least one identifier for the plurality of segments, wherein the at least one identifier is associated with one or more confidence values;

convert, in response to determining at least a subset of the one or more confidence values is equal to or greater than a threshold, and based on a set of rules defined by a first GraphQL database schema, the natural language input into a single search query executable by Application Programming Interface (API) in a query language of GraphQL; and initiate, based on a second GraphQL database schema different from the first GraphQL database schema, the single search query to fetch content from a database so as to prevent transmission of multiple search requests by the client device responsive to the natural language input.

17. The non-transitory computer-readable media of claim 16, wherein the instructions, when executed, further cause the computing device to:

discard one or more of the plurality of segments based on determining that a first confidence value of the one or more confidence values satisfies a second threshold.

18. The non-transitory computer-readable media of claim 16, wherein the instructions, when executed, further cause the computing device to:

determine the one or more confidence values.

19. The non-transitory computer-readable media of claim 16, wherein the instructions, when executed, further cause the computing device to convert the natural language input further based on determining, based on the set of rules, that one or more of the plurality of segments corresponds to a search operation.

20. The non-transitory computer-readable media of claim 16, wherein the instructions, when executed, further cause the computing device to:

remove, from the text string and based on a stop word list, one or more words.

21. The method of claim 1, further comprising:

validating the single search query based on the second GraphQL database schema.

* * * * *